United States Patent

[11] 3,528,402

[72] Inventor William L. Abramowitz
 330 Stuart St., Boston, Massachusetts 02116
[21] Appl. No. 524,516
[22] Filed Feb. 2, 1966
[45] Patented Sept. 15, 1970

[54] MEANS AND METHOD FOR INTERNALLY DETECTING THE PRESENCE OF AN INTRAUTERINE CONTRACEPTIVE DEVICE
5 Claims, 5 Drawing Figs.

[52] U.S. Cl. .................................................... 128/2
[51] Int. Cl. .................................................... A61b 5/06
[50] Field of Search .......................................... 128/1.3, 2,
 260, 130, 356, 408, 420—424, 2.1, 303, 419;
 340/258; 324/43, 47

[56] References Cited
UNITED STATES PATENTS
2,516,520 7/1950 Lamport et al. ............. 324/130UX
2,752,564 6/1956 Ryerson ..................... 324/43

FOREIGN PATENTS
994,400 6/1965 Great Britain ............. 128/2

OTHER REFERENCES
Geyger: "Electronics," June 1, 1962, pp. 48—52.

Primary Examiner—William E. Kamm
Attorney—Ostrolenk, Faber, Gerb and Soffen

ABSTRACT: A method and apparatus for detecting the presence of contraceptive devices which are either provided with a magnetized member or are formed of a magnetizable material which is transversely magnetized before positioning in the uterus.
The detection device is comprised of an electronic circuit coupled to probe means which includes a magnetic core for generating an even harmonic function signal in the presence of the contraceptive device detection being performed by positioning the patient near the probe or passing by the probe and in close proximity thereto. Nulling means are provided for cancelling out the effect of any extraneous field such as, for example, the earth's magnetic field so that the extraneous fields will not affect the sensitivity of the detection device in the presence of the contraceptive device.

INVENTOR.
WILLIAM L. ABRAMOWITZ
BY
OSTROLENK, FABER, GERB & SOFFEN
ATTORNEYS

INVENTOR.
WILLIAM L. ABRAMOWITZ
BY
OSTROLENK, FABER, GERB & SOFFEN
ATTORNEYS

MEANS AND METHOD FOR INTERNALLY DETECTING THE PRESENCE OF AN INTRAUTERINE CONTRACEPTIVE DEVICE

This invention relates to an improved intrauterine contraceptive device (hereinafter referred to as an IUCD) which is placed for long periods of time in the female reproductive tract, and to a novel method and apparatus for positively detecting the presence and general position of such device.

The population explosion is a world-wide problem which has prompted man to seek contraceptive devices which are safe, reliable, and easy to use. Potentially, intrauterine contraception offers significant advantages for selected populations and individuals. Such advantages include disassociation of the contraceptive method from coitus, subjective unawareness of the presence of the device, and freedom from the necessity of constantly replenishing contraceptive supplies.

It is well established that a plastic or metal coil, ring or twisted shaped object placed by a physician into the uterine cavity will be effective as a contraceptive. If such a device is properly designed as to size and shape it causes no discomfort to the wearer, may be worn for long periods of time, and is almost 100 percent effective in its purpose.

The most serious difficulty with intrauterine contraceptive devices is that approximately one woman out of 10 expels the device, usually within two months of insertion. The woman is often unaware of expulsion and 50 percent of the IUCD contraceptive failures are a consequence of the device being expelled without the user's knowledge. To guard against unsuspected loss of the devices, many of the present IUCDs carry a plastic tail which protrudes slightly from the cervical opening. A woman can then examine herself to make sure that the device is in place.

Many forms of IUCDs, however, possess round ring or coil shapes which cannot conveniently have extensions formed thereon. Moreover, those IUCDs which are provided with tails or other projecting parts have frequently been found to be painful and uncomfortable. Additionally, the periodic examinations necessary to ascertain the location of such devices may be painful or inconvenient. Such examinations, when performed by a physician, may be too costly.

It is therefore desirable to provide an external detection procedure for the determination of the presence or absence, and general location of an IUCD within a woman's body. (If present, it is in its correct location, otherwise it is expelled). Such a procedure would eliminate pain, discomfort and frequent physical examinations.

Accordingly, a principal object of the present invention is to provide an efficient and economical procedure for externally determining the presence/absence and general location of an IUCD device within the woman's body.

Yet a further object is to provide an apparatus useful in the practice of such procedure.

Other objects of the invention will appear as the following description of preferred and practical embodiments thereof proceeds.

For a better understanding of the invention reference may be had to the accompanying drawings, in which:

FIGS. 1b and 1c are schematic diagrams showing alternative embodiments which may be substituted for the circuitry of FIG. 1a;

Figure 1A:
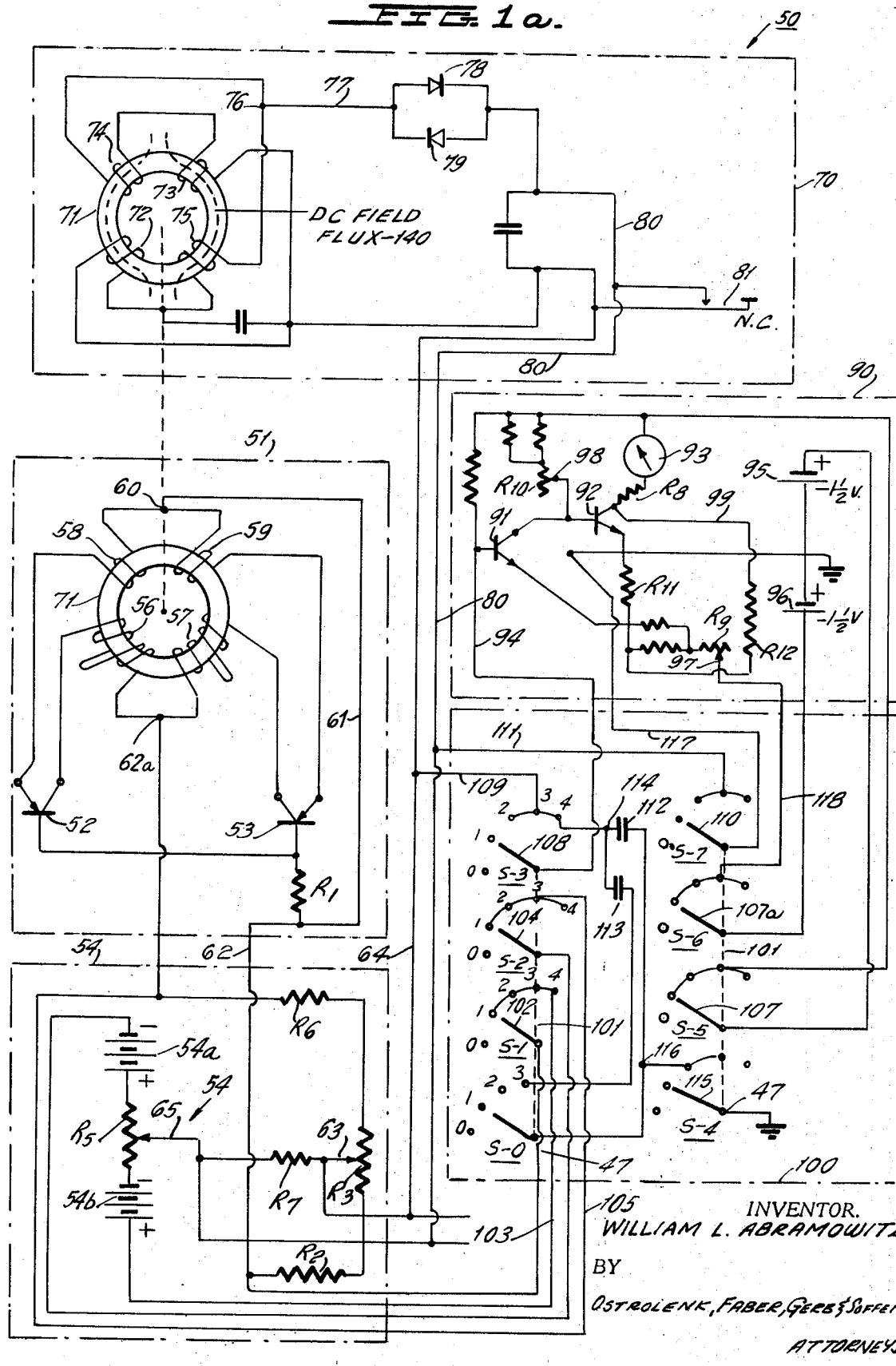
FIG. 1a is the basic circuit of the detection device to be used outside the body to detect the position of the IUCD.

The contraceptive element detected by one form of the present invention comprises a plastic intrauterine device, containing a magnetic core element. Such element, which is sealed within the walls of the IUCD so as not to come in contact with any vaginal secretions, is of a size and shape such that it does not materially decrease the desired flexibility of the plastic body. Alternatively, the contraceptive element may be a specially magnetized stainless steel "Hall-Stone" ring.

The detection apparatus is comprised of alternately saturable magnetic means which, in the absence of any outside ambient, magnetic field will not produce any even harmonic signals. However, in the presence of exterior magnetic influences a significant second harmonic signal is generated and is indicated as such by a suitable indicating meter or other device. The detection means includes adjustable circuit means for substantially compensating for, or desensitizing (neutralizing) the device to the presence of the earth's magnetic field, as well as to other magnetic influences or disturbances which are located at appreciable distances from the detection device relative to the contraceptive device to be detected.

The detection means is operated by first making suitable adjustments to the device to "null out" the earth's magnetic field and other ambient field steady state influences. The patient to be examined is then positioned in close proximity to the detection device probe which is positioned generally within the region in which the contraceptive device is located but in all cases the probe is located exterior to the body of the patient. No direct physical contact need be made with the extreme tip of the probe and the body of the patient. In fact, it is important that the patient does not contact the probe, because it might move, which could disturb the "null" setting. Accordingly, a shield is provided in close proximity to the detecting head, which shield the patient may approach and even touch, without disturbing the setting. The positioning of the patient relative to the probe will cause a significant deflection of the indicating meter if the contraceptive device is present in its proper location, thereby allowing for an examination which may be made completely exterior to the body of the patient and is in no way either a tedious or a painful examination.

In accordance with the present invention the presence or absence and general position of such magnetic element containing IUCDs and magnetized "Hall-Stone" rings may be accurately and reliably detected by means of the devices illustrated in FIGS. 1a through 2a. It should be understood that the detector mechanisms shown in the drawings are so designated as to indicate the presence of any of the IUCDs, with indications depending upon the strength of the magnetic field generated by any of these devices.

Figure 2:
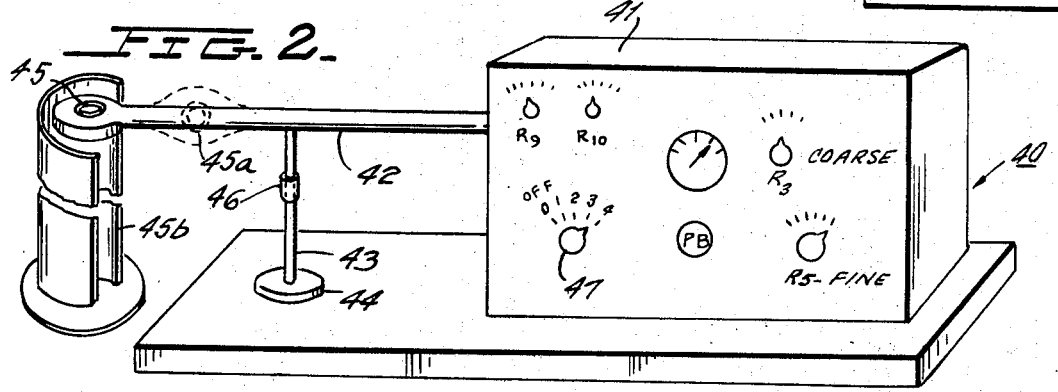
FIG. 2 is a perspective view of the apparatus used for detection.

The detection device 40, shown in FIG. 2, is comprised of a housing 41 containing the electronic circuitry of the detection device, as well as various control knobs and instrument readings, to be more fully described subsequently, which are employed for the purpose of adjusting the sensitivity of the device and nulling-out the effects of the earth's magnetic field, as well as for providing an indication of the presence of the IUCD.

The detection device 40 is further comprised of a probe member 42 extending from one end of the housing, which device is maintained in a substantially horizontal position by means of a supporting leg 43 having a suitable base 44. The detection device magnetic core assemblies 45 and/or 45a (in cases where two assemblies are employed) are housed at the extreme end of the probe member 42 and will be described subsequently in more detail. The device 40 may be placed upon any suitable support such as a desk, table, and the like, with the support leg 43 having an adjusting assembly 46 for adjusting the height of the probe detectors 45 or 45a. The purpose to be achieved by the adjustment device is to place the probe detectors 45 or 45a at substantially the same level as the IUCD is positioned within the woman being examined. Since the heights of various patients can differ the adjustable feature will allow for the adequate level positioning of probe detectors 45 or 45a. Alternatively, the probes 45 or 45a may be adjustably affixed to a table and connected by wire cable to the control box.

Referring more particularly to FIG. 1a, there is shown therein the basic circuit employed for the purpose of providing for detection of the IUCD device. Before describing the circuit details of the detector device, it must be emphasized that the magnetic moment, or detectability is very low indeed for small magnets located in the range from 5—10 inches from the detector probe, which is approximately the body thickness of the person being examined. Small magnets of the size compatible with intrauterine devices will not deflect an ordinary compass needle from this distance. The earth's magnetic field, for example, has 300—500 times as great an effect upon a compass, even when the intrauterine magnet is brought up quite close to the compass needle. It is for this reason that ordinary detection means are ineffective and none of the prior art measuring devices, even those which are very sophisticated and extremely sensitive, have been able to provide for magnetic detection of such devices in the 5—10 inches distance range.

Strongly magnetized wire of approximately 1" in length, and which may be inserted into one of the IUCDs will begin to be detectible by a compass needle when positioned from ½"¡ —⅜" away from the compass needle. If it is moved a distance of 10" (i.e., 20—30 times further away) the amplification factor for detection varies as the third power requiring an amplification factor of $30^3$ or 27,000. Even for an electronic device, this represents a high amplification factor. The cube law, as opposed to the square law, becomes the necessary amplification factor for detecting this type of magnetic device since both magnetic poles of the magnet being detected affect the detector device, with one pole aiding and the other opposing detection. This is due to the fact that the magnetic member has a relatively short length when compared to the detection distance.

Referring now to the circuit diagram of FIG. 1a, there is shown therein an oscillator circuit 51 comprised of first and second transistors 52 and 53, which are driven by suitable power supply means 54 for generating current in their collector windings 56 and 57, respectively. The emitter windings 58 and 59, respectively, are coupled at a common terminal 60 at which point a feedback path 61 is connected to feed back a portion of the output energy through a resistor R1 to the base electrodes of transistors 52 and 53. The feedback path sustains oscillation thereby generating alternating magnetic flux in core 71 having a predetermined frequency, $f$. It should be noted that only a single core 71 is employed which is common to both the oscillator and detector windings —they are on the same core— separate toroids 71—71 are shown for clarity only. Lead 62 and lead 61 are power connections. Resistors R2, R6, adjustable resistor R3, adjustable resistor arm 63 and leads 64 and 80 provide the coarse adjustment voltage for the "nulling" circuit to counteract the ambient field seen by the magnetometer detector circuit 70. Voltage dropping resistor R5 is made adjustable to provide for fine adjustment of the nulling voltage.

The detection device 70 is comprised of a saturable magnetic core 71 having two pairs of oppositely connected windings 72 and 75 and 73 and 74 wound on the same core which is driven by the oscillator means 51 for the purpose of alternately driving the saturable core 71 into its two saturation states. These pairs of second harmonic detection windings wound about core 71 will detect and provide a voltage output signal having a frequency $2f$ (where $f$ is the frequency of the signal generated by oscillator 51), which second harmonic output is a function of the constant or d.c. magnetic field in the immediate region of core 71 such as, for example, the earth's magnetic field. Assuming that the detection device 70 were placed in a medium in which there is no flux field whatsoever, then no second harmonic signal would be generated, i.e., the output of the pick-off coils would be zero. (It should be noted that the d.c. field flux path 140 is shown in dotted fashion in FIG. 13a).

One terminal of each pick-off winding 74 and 75 is connected in common at terminal 76 which is, in turn, connected through conductor 77 to (demodulator) rectification means comprised of parallel oppositely connected diodes 78 and 79 for the purpose of rectifying the output signal to form a d.c. voltage proportional to the second harmonic signal. The second harmonic signal is coupled through a conductor 80 into the control section 100 which, in turn, is coupled to the input of the amplifier section 90 for amplifying the rectified signal and providing a visually observable indication of the presence or absence of a magnetically polarized element such as an IUCD, for example. Normally, closed switch means 81 acts to short out the input leads 64 and 80 from detection device 70 until it is desired to take a reading and operates in a manner to be more fully described.

It is well known that any magnetic system, driven beyond its saturation point, will contain only odd harmonic components in the absence of a steady (d.c.) polarizing flux field. The saturated flux system, in the presence of a d.c. or biasing magnetic field, however, will contain all harmonics, both even and odd. In the detection system of the instant invention, the earth's magnetic flux field, as well as the magnetic field from the IUCD, produce the d.c. or steady biasing flux fields. These are the influences that produce the second harmonic voltage, the magnitude of which is measured to determine the presence or absence of the intrauterine device.

As was previously described, it is a practical impossibility to detect the presence of a magnetically polarized member placed a distance from 5—10" away from a compass needle and thus very much more sensitive detection means are required.

It has been determined after exhaustive experimentation with small magnets of the type described herein held 5—10" away from the detection devices 51 and 70 of FIG. 1a will produce a rectified d.c. output of an amplitude of the order of 0.07—0.10 millivolts. It is therefore necessary to provide an amplifier having the characteristics of providing extremely high gain and preferably being capable of being produced at relatively low cost.

The amplifier device 90 of the instant invention, which provides the necessary gain characteristics and which is quite inexpensive to manufacture, is comprised of first and second interconnected transistors 91 and 92 with the collector of transistor 91 being coupled to the base of transistor 92 and with the collector of transistor 92 being coupled to a suitable current indicating instrument 93 such as, for example, a moving coil 1 milliammeter instrument, through resistor $R_8$.

The transistors are so connected and adjusted as to have their steady state d.c. output, in the presence of no input signal, to be 0.5 milliamps with the input 94 being either open-circuited or short-circuited. This is to allow for subsequent switching operations. The amplifier then is properly biased so that it becomes sensitive to the voltage changes in the input circuit since the steady state condition is preliminarily adjusted in the absence of any input voltage signal. The amplifier circuit 90 has the additional advantage of providing a directional characteristic in that the indication by the meter 93 will increase or decrease with changes in magnetic polarization of the steady magnetic flux field, from the initially set 0.5 milliamp condition.

The dotted rectangle 100 represents the adjustable double ganged switch 47, also shown as being positioned along the front face of the housing 41, shown in FIG. 2. The adjustable knob 47 controls the operation of 2 double-four ganged switches S—0 through S—4 with the mechanical coupling being shown by the dotted lines 101—101. With the control knob 47 in the "0" position, it can be seen that all switches have their wiper arms out of electrical engagement, thereby disengaging the electrical paths from the supplies 54a, 54b, 95, and 96. It can clearly be seen that switch position "0" constitutes the "OFF" position of the detector device.

Moving control knob 47 to the "1" position, couples wiper arm 102 of switch S—1 to conductor 103, establishing a current path between the lower power supply 54b and resistors R1 and R2. At this time switch S—2 has its wiper arm 104 electrically connected to conductor 105, electrically connecting the upper power supply 54 to common terminal 62a and resistor R6. Switch position "1" of control knob 47 thereby energizes oscillator 51.

Simultaneously therewith switch S—5, which is ganged to control knob 47, establishes an electrical path between the amplifier power supply 95 and one terminal of meter 93.

Ganged switch S—6, through its wiper arm 107a establishes an electrical path from amplifier power supply 96 through switch S—6 to the adjustable arm 97 of adjustable resistor R9. Thus, the amplifier is energized in readiness for a detection operation.

The detection operation is performed as follows:

A 1-milliamp full scale meter, is set to provide a one-half scale reading (i.e., 0.5 milliamps) by adjustment of the resistor R—10 when the input connections 64 and 84 see an open-circuit condition. The input to the amplifier 90 can be seen to be open-circuited due to the fact that the wiper arm 108 of switch S—3 is electrically disconnected from input conductor 109 with the control knob 47 in position "1" and that the switch S—7 has its wiper arm 110 disconnected from conductor 111, with control knob 47 in the "1" position. Wiper arms 108 and 110 can be seen to be connected to the base of transistor 91 and to a ground potential, respectively, as shown in the amplifier circuit 90.

The input connections are then short-circuited by movement of control knob 47 to position "2" coupling the input conductors 109 and 111 to the base of transistor 91 and ground potential, respectively. The input is short-circuited due to the normally closed position of the push-button switch 81. In the short-circuited condition, the adjustable arm 97 of resistor R—9 is adjusted in order to maintain the same deflection (i.e., 0.5 milliamp reading). One or two such adjustments of both resistors R9 and R10 (shown on 40 also) may be necessary before placing the amplifier in use. Once these adjustments have been made, the open-circuit adjustment will maintain itself for very long periods of time. It may, however, become necessary to readjust the short-circuit condition during the use of the instrument, as will be more fully described.

A feedback path 99 may be provided between the collector electrode of transistor 92 and its emitter through resistor R12 in order to provide feedback compensation for temperature drift and changes in the components of amplifier 90.

The amplifier circuit 90 has been shown to have an amplification factor in the range from 30,000—60,000, depending upon the particular transistors employed and thereby is well suited for use in detector circuits of 1a, 1b, or 1c.

Due to the fact that the earth's magnetic flux field is most overpowering in its effect upon the detection circuitry and will dominate by many fold the magnetic field which it is desired to measure, the first objective is that of neutralizing or nulling-out the influence of the earth's magnetic field.

This objective is achieved by aligning the detector device 40, shown in FIG. 2, into a fixed position upon its supporting surface and then applying a variable (plus or minus) voltage of an exactly sufficient magnitude such that the amplifier will indicate "0" input (i.e., will provide a reading of one-half scale).

The variable d.c. voltage is taken from the basic detector power supply 54 and coarse and fine adjustments provided through the adjustable arms 63 and 65 of adjustable resistors R3 and R5, respectively, (knobs shown on 40, also), to provide for absolutely exact neutralization of the earth's magnetic field. As a practical matter, it has been found that a voltage of .3 volts d.c. maximum (plus or minus) is normally required to null-out the earth's magnetic field, when it has its maximum influence.

Once an exactly balanced condition is achieved, the instrument 40 is then ready to indicate the presence or absence of the relatively small magnetic field produced by the intrauterine device. When the IUCD is brought near the detector, a relatively strong indication occurs, depending upon its magnetic strength, its distance from the detector, and its angular (spatial) orientation to the major axis of the detector pairs of coils 72 through 75. It should be noted that the detector is highly directional and that the largest indications are directly along the dividing line major axis of the pick-off coils wound about magnetic core 71. These d.c. flux axes are shown as dotted lines in FIGS. 1a, 1b.

The instrument once balanced, will detect not only the intrauterine devices, but any and all changes in the ambient magnetic flux field strength in which the detecting head 45 of FIG. 2 is located. The ambient field strength within the immediate locality of the instrument 40 is strongly affected by automobiles passing along roads which may be within 50'j —100', elevators in buildings, power line surges and the like. In large cities such field variations become a major factor which can render the detection devices useless due to the presence of such major disturbing magnetic masses and flux fields.

In order to minimize such disturbances, a pair of loading capacitances 112 and 113 are provided in the control circuitry 100, which capacitances are coupled across the amplifier input line for the purpose of smoothing or averaging the amplifier output signal so that variable electromagnetic influences such as moving traffic, elevators and the like, will have less steady-state effect upon the indicator means 93. Although the capacitance devices tend to slow down the response to the desired signal, which is a steady-state condition, the indicator needle will tend to settle upon the steady-state condition while variable disturbances generally tend to cancel or smooth themselves out during the detection process.

In operation, the detection device is short-circuited through the normally closed push-button 81. Once the one-half of full scale position is set in the manner previously described, the operator depresses push-button 81 momentarily to check the null position of the device. A few trials will determine the best position to null out the earth's magnetic field, as well as all other extraneous magnetic fields in the vicinity. The depression of the push-button 81 also determines the absence or presence of any disturbing influences. If the disturbing influences are excessive, maximum shunting capacity may be employed by placing the control knob 47 in the "3" position, placing the ganged switch S—3, wiper arm 108, in electrical contact with a common terminal 114 of capacitors 112 and 113. At this time switch S—0 couples capacitor 113 in parallel across capacitor 112. Switch S—4, which has its wiper arm 115 connected to ground potential, couples the opposite terminal 116, which is connected in common to capacitors 112 and 113, to a ground potential, thereby placing both capacitors in the circuit to provide for maximum shunting capacitance. If the disturbing influences are not too great, the control knob 47 may be placed in the "2" position, placing only capacitor 112 across the amplifier input. If the disturbing influences are insignificant, control knob 47 may be placed in the "4" position so that no shunting capacitance is applied across the input to amplifier 90.

The advantage of providing the normally closed switch 81 is that the capacitors 112 and 113 are automatically discharged prior to each detection operation. The normally closed push-button also continually allows adjustable resistance R—9 to be monitored and adjusted as necessary.

If none of the above corrective functions are completely satisfactory, the entire instrument 40, shown in FIG. 14, may be reoriented in order to seek out a position where interference is minimal. This is possible due to the fact that the detector heads 45 and 42 are orientation sensitive and that the earth's magnetic flux field has orientation with respect to disturbances so that there are generally at least two minimum disturbance orientations to which it is possible to orient the device.

In order to detect the presence of the IUCD, the patient may either stand motionless immediately adjacent the end of probe 42 or may pass by the probe. It is not at all necessary that the patient make any physical contact whatsoever with the probe. In fact, it is preferred not to move or disturb same, hence the use of shield 45b which substantially surrounds the probe 45. With a shield, or firmly fixed detecting head, the patient moves around and close to the head. This causes an indicator deflection regardless of how the IUCD may be positioned in the person. If the patient did not move, there might be a possibility that the north and south poles might react equally and cancel out, in some cases. In determining the flux field situation at or before the instant of the detection operation, the patient may or may not be positioned close to the probe. There is no capacitance effect caused by having the patient stand in close proximity to the basic detector or amplifier which is a marked advantage over other devices such as metal detectors employing beat frequency oscillators and the like.

It should be noted that while the device 50 of FIG. 1a employs an oscillator device employing a ferrite core member, other oscillator circuits may be employed which are capable of generating an oscillating signal of a suitable frequency.

Figure 1B:
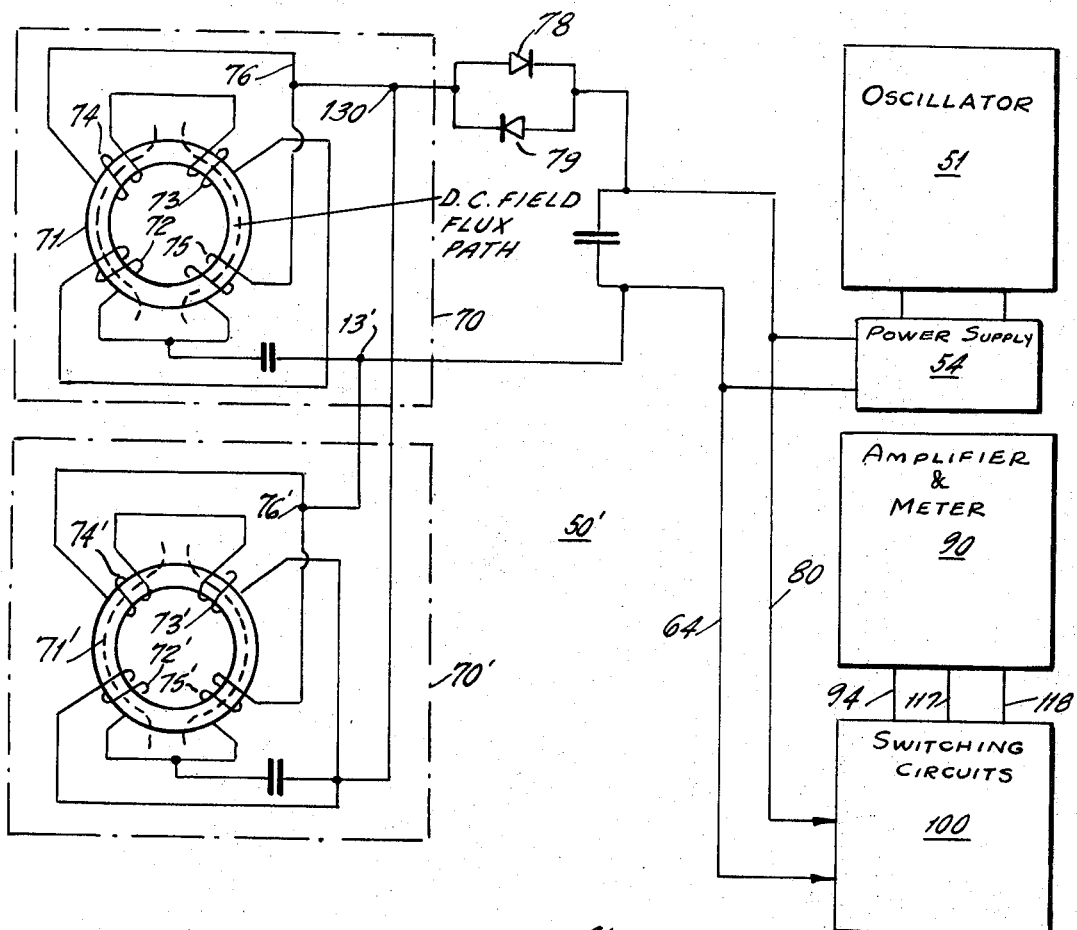

FIG. 1b shows an alternative detection circuit 50' (second harmonic detection coils only-oscillator not shown), which may be substituted for the detection circuit 50 shown in FIG. 1a and which is extremely advantageous for use in detecting IUCD devices of the type commonly referred to as a Hall-Stone Ring, which is a circular coiled endless spring having a diameter of approximately ⅝" and being formed of 0.022" wire of #316 stainless steel. As of the present state of the art, such Hall-Stone Rings have been undetectable except by X-ray, sonar, and probing. Such rings, however, are quite compatible with human tissue and do not adhere to internal parts of the body or cause any undesirable reactions. Such Hall-Stone Rings are preferably magnetized across a major diameter so as to have one North and one South pole. The magnetism of the device, if driven to a staturating condition, will be retained indefinitely unless brought into contact with another much stronger magnet. Due to the fact that the resulting magnet is much weaker in flux field strength than that obtainable by other means previously described, ambient field variations will have relatively more effect, therefore, it is necessary to modify the detection device in the manner shown in FIG. 1b by providing a second detection coil circuit 70' which is coupled across the detection circuit 70 at terminals 130 and 131 so as to be connected with opposing polarities. The second detection coil serves automatically to "null out" in large measure, the earth's magnetic field and any fluctuations thereof. The two sets of second harmonic detection windings are connected in parallel but with opposing polarities with one set 72 through 75 bucking the other set 72' through 75'. These detection members 70 and 70' are affixed firmly to a base member (not shown) and are arranged with their axes in exact alignment in the manner shown in FIG. 2a on the probe 42. All of the like coils as between the detection units 70 and 70' have the same number of turns, are mounted upon magnetic cores of similar magnetic material and therefore, have substantially the same sensitivity to d.c. flux changes. Thus, once the device is properly set the reaction to changes in field strength remains about the same regardless of the direction in which the assembly is pointed.

However, the total magnitude (not sensitivity) of each separate detection device is not exactly the same due to variations in winding distribution, etc., and it is necessary to balance out this difference by an external voltage similar to that described with reference to the circuit of FIG. 13a. Thus, after the detector assembly is pointed in the desired direction, the entire detection system is adjusted to a null position, bringing the indication of the meter to half-scale using the same procedure as was previously described. This system is capable of detecting the presence of the magnetized Hall-Stone type rings already described, as well as any of the other previously mentioned magnetized devices.

The arrangement of FIG. 1b has many virtues. Firstly, the device is quite immune to magnetic variations and other magnetic fluctuations inherently found in large cities with disturbances such as passing traffic, elevators, and power line surges having very little effect upon the device. This makes it much easier to detect weak magnetic fields without these fields being completely overshadowed by the earth's magnetic field variations. Secondly, the detection system stays reasonably fixed once properly adjusted and it is not necessary to use the manual push-button 81, previously described. The detection operation may be performed by having the patient pass by in close proximity to the detection coils which are held motionless during the test as was previously the case.

Figure 1C:
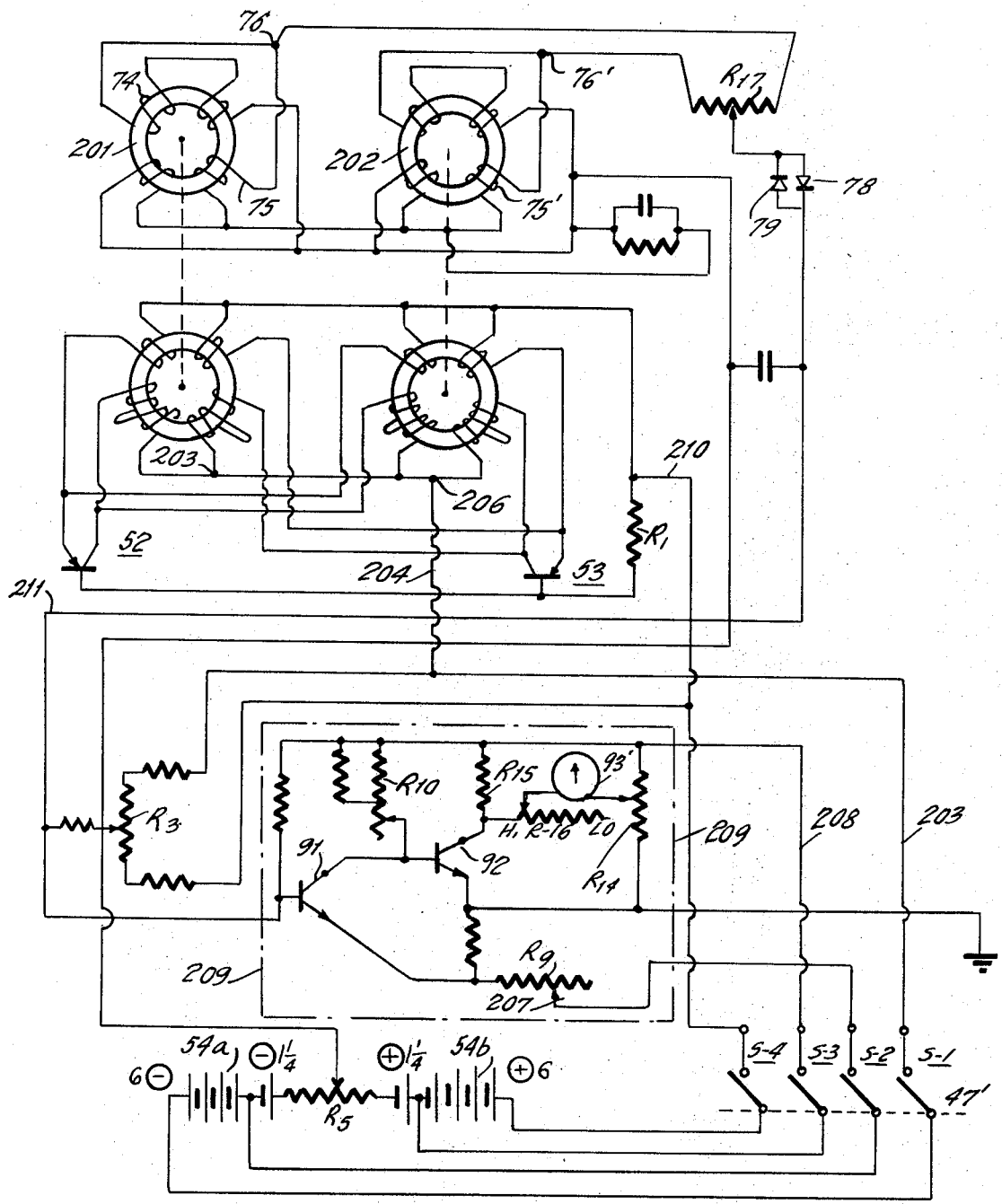

FIG. 1c shows a complete circuit alternative embodiment for detecting the presence of a magnetized IUCD.

This embodiment is comprised of two toroidal cores, connected bucking, in parallel, for the detecting portions as previously described. The two cores appear as four cores for purposes of simplicity and only two cores are actually employed.

However, the oscillator portions for both cores are driven by only two transistors 52 and 53, the same as previously described and shown in FIG. 1a. All windings are connected in parallel. The same transistors carry twice the previous load, hence resistor R1 is to reduced to one-half its former value.

Also shown is a different arrangement for the indicating meter 93'. A more sensitive −25−0±25 microammeter is used, which has its zero setting maintained by an adjustable voltage dropping resistor R14. As before, adjustments are made to resistors R9 and R10, to maintain and bring the instrument to its mid-point or zero reading. It should be noted that the 0.5 m.a. operating condition is preset by proper choice of resistor R15 in this embodiment. Resistor R16 is also provided to allow for two sensitivities, "High" and "Low", to give the instrument more flexibility.

The switch 47', when closed puts the system in operation. Resistor R17 is additionally provided to effect a fine balance between the two output sets of windings. This is a refinement. Once set, this rarely would need changing for the same general area and orientation. The positive side of power supply 54a is connected through switch S—2 to adjustable arm 207 of resistor R9. The negative side of power supply 54b is coupled through switch contacts S—3 to the supply bus 208 of the amplifier section. The positive side of power supply 54b is coupled through contact pair S—4 and lead 210 to one terminal of resistor R1. The parallel output winding pairs 74—75, 74'-—75', have their common terminals 76 and 76' respectively, coupled across the terminals of adjustable resistor R17 which, in turn, couples the resultant output through the rectifying diodes 78 and 79 to the base electrode of transistor 91 through lead 211.

Figure 2A:
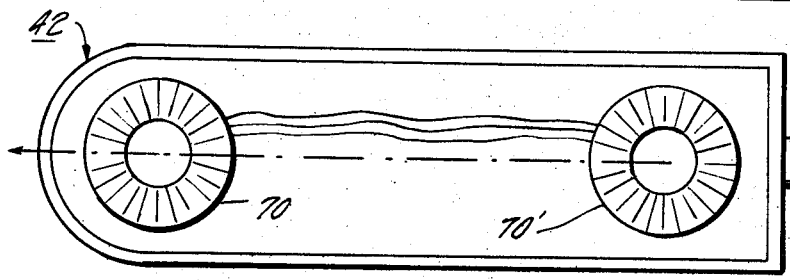
FIG. 2a is a detailed view of an alternative probe which is employed with the circuit of FIGS. 1b and 1c.

The detection members 70 and 70', as shown in FIG. 2a, are spaced approximately 4"—5" apart. The outermost assembly 70 yields the primary indication for close magnets being detected, but both react substantially the same for distant objects such as automobiles, the earth's magnetic field, and so forth. For near magnets both assemblies react, but the near assembly 70 has a far stronger effect than the far assembly 70', as shown by the relationship:

$$\frac{1}{X^3} - \frac{1}{(X+1)^3}$$

where X is the distance from the near or major assembly with X being measured in units of the assembly spacing (4" to 5").

From the above formula, if the assemblies are spaced 5" apart a magnet brought within 5" of the detecting assembly in line with 70, will result in a net of 88 percent effect due to the second assembly 70' being present. A magnet 50" away from the device will have but 25 percent of the net effect and this falls off quite rapidly with increasing distances. It should be noted that the remaining circuits 51, 54, 90 and 100 of FIG. 1b are substantially identical to those shown in FIG. 1a and they have been shown therefore in block diagram form for purposes of simplicity. FIG. 1c shows clearly a simplified complete circuit, including all elements.

It can therefore be seen from the foregoing that the instant invention provides novel intrauterine devices and a relatively simple and yet sensitive method and apparatus for readily detecting the location of such IUCDs.

While there has been described herein magnetic core means for detecting the presence of magnetic fields, other devices may be employed for detection of magnetic fields without departing from the spirit of the instant invention. For example, Hall effect or magneto resistive effect devices may be employed. Such devices are typically comprised of indium antimonide or indium arsenide, which materials change their resistance in the presence of a magnetic field. Such materials are also direction sensitive. Readings can be obtained by passing a current through a conductor formed of a material having Hall effect characteristics, and reading the potential gradient developed across the current-carrying conductor.

Although there have been described preferred embodiments of this novel invention, many variations and modifications will now be apparent to those skilled in the art. In particular, I wish to point out that Hall Effect probes, as well as magnetoresistive probes may be substituted for the second harmonic magnetic field responsive detectors herein described. Therefore, this invention is to be limited, not by the specific disclosure herein, but only by the appended claims.

I claim:

1. Means for detecting a magnetized contraceptive device adapted to be positioned within the uterus of a subject wherein the detection occurs as and when the subject moves past and in close proximity to the detecting means, comprising:

oscillator means for generating signals of a predetermined frequency;

a magnetic core;

first and second groups of windings wound about and magnetically coupled to said magnetic core;

said first group of windings being coupled to said oscillator means for causing the signals of said oscillator means to drive said magnetic core into its opposite saturation states at a rate determined by the output signals of said oscillator means;

means coupled to said second group of windings for causing said second group of windings to generate output signals only when changes in the magnetic saturation state of said magnetic core occur at a frequency rate which is an even harmonic frequency of the operating frequency of said oscillator means;

rectifier means coupled to said second group of windings for rectifying the output signals of said second group of windings;

amplifier means for amplifying the output of said rectifier means;

indicating means for providing a visual indication of said amplifier means output; and D.C. power supply means including means for adjusting the output of said power supply means coupled to the first group of windings for said detector means for substantially canceling the effect of the earth's magnetic field upon said detector means to improve the capability of the detector means in detecting small magnetized objects.

2. The device of claim 1 further comprising capacitance means coupled across the input of said amplifier means for smoothing the effect of spurious and variable magnetic influences upon said device; said capacitance means being adjustable to control the amount of smoothing desired.

3. Means for detecting a magnetized contraceptive device adapted to be positioned within the uterus of a subject wherein the detection occurs as and when the subject moves past and in close proximity to the detecting means, comprising:

oscillator means for generating signals of a predetermined frequency;

first and second magnetic cores;

first and second groups of windings being wound about and inductively coupled to said first magnetic core;

third and fourth groups of windings being wound about and inductively coupled to said second magnetic core;

said first and third groups of windings being electrically coupled to said oscillator means to cause the signals of said oscillator means to alternately drive said first and second cores into their opposite saturation states;

means coupled to said second and fourth groups of windings for causing said second and fourth groups of windings to generate output signals only when changes in the saturation states of their associated cores occur at a rate which is an even harmonic frequency of the operating frequency of said oscillator means;

plural rectifier means being coupled to each of said second and fourth groups of windings for rectifying the output signals thereof;

amplifier means for amplifying the outputs of said rectifier means;

indicating means for providing a visual indication of said amplifier means output; and the first and third groups of windings which are magnetically coupled to said first and second magnetic cores being coupled with their polarities opposing one another for substantially canceling the effect of the earth's magnetic field upon the detecting means.

4. The device of claim 3 further comprising adjustable voltage means coupled to the first and third groups of windings of said first and second magnetic cores for nulling out variations between said first and second detector means.

5. A method for detecting the presence of a magnetized member provided within a contraceptive device placed within the body of a subject by means of a magnetic detection means comprised of the steps of:

positioning said detection means in close proximity to that portion of the body of the subject containing said contraceptive device; providing relative movement between said detection means and said subject; adjusting said detection means to eliminate the effect of steady and distantly variable magnetic influences upon said detection device; developing an indication of the influence of the magnetic field of the contraceptive device upon the detection device to thereby provide an indication of the presence of the contraceptive device as and when the detection means is in close proximity to the body of the human containing said contraceptive device.